(12) United States Patent
Harmon et al.

(10) Patent No.: US 11,191,207 B2
(45) Date of Patent: Dec. 7, 2021

(54) COMMODITY METERING SYSTEM FOR WORK VEHICLE AND CALIBRATION METHOD FOR SAME

(71) Applicant: Deere & Company, Moline, IL (US)

(72) Inventors: Andrew W. Harmon, Davenport, IA (US); Robert T. Casper, Davenport, IA (US); William Douglas Graham, East Moline, IL (US)

(73) Assignee: DEERE & COMPANY, Moline, IL (US)

(*) Notice: Subject to any disclaimer, the term of this patent is extended or adjusted under 35 U.S.C. 154(b) by 530 days.

(21) Appl. No.: 15/711,840

(22) Filed: Sep. 21, 2017

(65) Prior Publication Data

US 2019/0082586 A1    Mar. 21, 2019

(51) Int. Cl.
| | |
|---|---|
| *A01C 7/10* | (2006.01) |
| *A01C 7/08* | (2006.01) |
| *A01C 19/02* | (2006.01) |
| *A01B 79/00* | (2006.01) |
| *A01C 21/00* | (2006.01) |

(52) U.S. Cl.
CPC .............. *A01C 7/107* (2013.01); *A01C 7/081* (2013.01); *A01C 7/105* (2013.01); *A01B 79/005* (2013.01); *A01C 7/102* (2013.01); *A01C 19/02* (2013.01); *A01C 21/005* (2013.01)

(58) Field of Classification Search
None
See application file for complete search history.

(56) References Cited

U.S. PATENT DOCUMENTS

| | | | |
|---|---|---|---|
| 4,216,730 A | 8/1980 | Noble | |
| 4,834,004 A * | 5/1989 | Butuk | A01C 15/04 111/200 |
| 4,896,615 A | 1/1990 | Hood, Jr. et al. | |
| 5,081,600 A * | 1/1992 | Tump | G05D 7/0611 177/105 |
| 5,574,657 A * | 11/1996 | Tofte | A01C 23/007 700/240 |
| 5,684,476 A | 11/1997 | Anderson | |
| 5,845,818 A | 12/1998 | Gregor et al. | |
| 6,584,424 B2 * | 6/2003 | Hardt | A01D 41/1272 460/1 |

(Continued)

FOREIGN PATENT DOCUMENTS

| | | |
|---|---|---|
| DE | 2843487 A1 | 4/1980 |
| DE | 102012111144 A1 | 5/2014 |
| EP | 0278251 A1 | 8/1988 |

OTHER PUBLICATIONS

New Holland, Product Calibration Procedures, 5 Working Operations Excerpt, undated admitted art.

(Continued)

*Primary Examiner* — Eman A Alkafawi
*Assistant Examiner* — Leonard S Liang
(74) *Attorney, Agent, or Firm* — Klintworth & Rozenblat IP LLP

(57) ABSTRACT

A metering system includes a plurality of metering elements that are independently controllable. A calibration method of the present disclosure includes generating calibration factors for the individual metering elements. Also, a method of the present disclosure includes operating the metering elements according to the respective calibration factor.

19 Claims, 7 Drawing Sheets

(56) References Cited

U.S. PATENT DOCUMENTS

| | | | |
|---|---|---|---|
| 8,082,809 B2* | 12/2011 | Luellen | G01N 1/04 73/863.41 |
| 8,132,521 B2 | 3/2012 | Snipes et al. | |
| 8,281,724 B2 | 10/2012 | Snipes | |
| 8,434,416 B2 | 5/2013 | Kowalchuk et al. | |
| 8,678,347 B2 | 3/2014 | Maro | |
| 8,695,396 B2* | 4/2014 | Landphair | A01C 7/081 73/1.16 |
| 9,043,096 B2* | 5/2015 | Zielke | A01D 41/1275 701/50 |
| 9,043,949 B2* | 6/2015 | Liu | A01C 7/107 |
| 9,591,799 B2 | 3/2017 | Henry | |
| 9,936,626 B2* | 4/2018 | Chahley | A01C 7/12 |
| 10,379,547 B2 | 8/2019 | Thompson et al. | |
| 10,575,457 B2* | 3/2020 | Felton | A01C 7/102 |
| 10,609,858 B2* | 4/2020 | Garner | A01C 7/105 |
| 2002/0170476 A1* | 11/2002 | Bogner | A01C 7/046 111/183 |
| 2009/0090283 A1 | 4/2009 | Riewerts | |
| 2009/0271136 A1* | 10/2009 | Beaujot | G01G 19/08 702/101 |
| 2011/0035163 A1* | 2/2011 | Landphair | A01C 7/081 702/45 |
| 2012/0036914 A1* | 2/2012 | Landphair | A01C 7/081 73/1.16 |
| 2012/0103238 A1* | 5/2012 | Beaujot | A01C 7/20 111/174 |
| 2012/0226461 A1* | 9/2012 | Kowalchuk | A01C 7/107 702/100 |
| 2013/0340610 A1 | 12/2013 | Maro | |
| 2014/0165890 A1* | 6/2014 | Graham | A01C 7/046 111/170 |
| 2014/0209000 A1 | 7/2014 | Henry | |
| 2015/0112556 A1* | 4/2015 | Meyer zu Hoberge | A01C 7/105 701/50 |
| 2015/0223390 A1* | 8/2015 | Wendte | A01C 7/04 111/177 |
| 2016/0120097 A1 | 5/2016 | Chahley et al. | |
| 2016/0120106 A1* | 5/2016 | Zacharias | A01C 7/082 137/637.1 |
| 2016/0120107 A1* | 5/2016 | Chahley | A01C 7/107 406/29 |
| 2016/0161306 A1* | 6/2016 | Gervais | G01F 1/06 73/861.73 |
| 2019/0000011 A1 | 1/2019 | Gervais et al. | |
| 2019/0033895 A1 | 1/2019 | Thompson et al. | |
| 2019/0037764 A1 | 2/2019 | Garner et al. | |
| 2019/0082583 A1 | 3/2019 | Garner | |
| 2019/0082585 A1 | 3/2019 | Felton et al. | |

OTHER PUBLICATIONS

John Deere, 1910 Air Cart Hydraulic Drive Meter Calibration, http://www.youtube.com/wath?v=yNC-cYSZDva, Dec. 13, 2012.

USPTO Office Action issued in pending U.S. Appl. No. 15/711,764 dated Jun. 27, 2019.

German Search Report for Application No. 102018214065 dated May 23, 2019.

German Search Report issued in German Patent Application No. 1020182140677 dated Apr. 30, 2020, in 10 pages.

German Search Report issued in German Patent Application No. 1020182140278 dated Apr. 28, 2020, in 8 pages.

* cited by examiner

COMMODITY METERING SYSTEM FOR WORK VEHICLE AND CALIBRATION METHOD FOR SAME

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and implements, and more specifically, to a commodity metering system for a work vehicle and a calibration method for the same.

BACKGROUND OF THE DISCLOSURE

Work vehicles, such as air seeders and other seeding devices, are configured for applying seed, fertilizer, and/or other particulate commodities to a field. The work vehicle may also include tilling equipment for applying the commodity under the surface of the soil.

Work vehicles typically include one or more tanks and a metering system that meters out a predetermined quantity of the commodity from the tank as the work vehicle moves across the field. The metered particles may move into a high velocity airstream generated by an airflow system of the vehicle. Once in the airstream, the particles are delivered to the soil. Alternatively, the metered particles may fall to the soil under the force of gravity.

SUMMARY OF THE DISCLOSURE

This disclosure provides an improved metering system and methods for calibrating the metering system.

In one aspect, the disclosure provides a method of calibrating a metering system for a work vehicle with a commodity container, wherein the metering system includes a plurality of metering elements, and the plurality of metering elements includes a first metering element and a second metering element. The method includes performing, by a control system having at least one processor, a calibration routine in which the first metering element and the second metering element independently meter a commodity from the commodity container through the metering system. The method also includes receiving, by the control system, a first measurement and a second measurement. The first measurement is related to a first amount of the commodity independently metered through the metering system by the first metering element during the calibration routine. The second measurement is related to a second amount of the commodity independently metered through the metering system by the second metering element during the calibration routine. The method further includes determining, by the control system, a first calibration factor for operating the first metering element based on the first measurement, and a second calibration factor for operating the second metering element based on the second measurement. Also, the method includes generating, by the control system, a first control command for the first metering element according to the first calibration factor, and a second control command for the second metering element according to the second calibration factor. Moreover, the method includes operating, by the control system, the first metering element according to the first control command, and the second metering element according to the second control command.

In another aspect, a work vehicle is disclosed that includes a commodity container and a metering system with a first metering element and a second metering element. The work vehicle further includes a sensor system and a control system with at least one processor. The control system is configured to perform a calibration routine in which the first metering element and the second metering element independently meter a commodity from the commodity container through the metering system. The control system is further configured to receive a first measurement and a second measurement from the sensor system. The first measurement is related to a first amount of the commodity independently metered through the metering system by the first metering element during the calibration routine, and the second measurement is related to a second amount of the commodity independently metered through the metering system by the second metering element during the calibration routine. The control system is also configured to determine a first calibration factor for operating the first metering element based on the first measurement, and a second calibration factor for operating the second metering element based on the second measurement. Moreover, the control system is configured to generate a first control command for the first metering element according to the first calibration factor, and a second control command for the second metering element according to the second calibration factor. Also, the control system is configured to operate the first metering element according to the first control command and the second metering element according to the second control command.

In an additional aspect, the disclosure provides a method of calibrating a metering system for a work vehicle with a commodity container. The metering system includes a plurality of metering elements. The plurality of metering elements includes a first metering element and a second metering element. The method includes performing, by a control system having at least one processor, at least one calibration routine including metering commodity from the commodity container through the metering system independently with the first metering element and the second metering element. The method also includes receiving, by the control system from a scale, a first weight of a first amount of the commodity independently metered through the metering system by the first metering element during the at least one calibration routine, and a second weight of a second amount of the commodity independently metered through the metering system by the second metering element during the at least one calibration routine. The method further includes determining, by the control system, a first calibration factor for operating the first metering element based on the first weight, and a second calibration factor for operating the second metering element based on the second weight. Also, the method includes storing, in a memory element, the first calibration factor and the second calibration factor. Moreover, the method includes receiving, by the control system, a target application rate and a ground speed signal. The ground speed signal relates to a ground speed condition of the work vehicle. Moreover, the method includes determining, by the control system, a first speed control command for the first metering element according to the target application rate, the ground speed signal, and the first calibration factor. Furthermore, the method includes determining, by the control system, a second speed control command for the second metering element according to the target application rate, the ground speed signal, and the second calibration factor. Additionally, the method includes operating, by the control system, the first metering element according to the first speed control command, and the second metering element according to the second speed control command.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
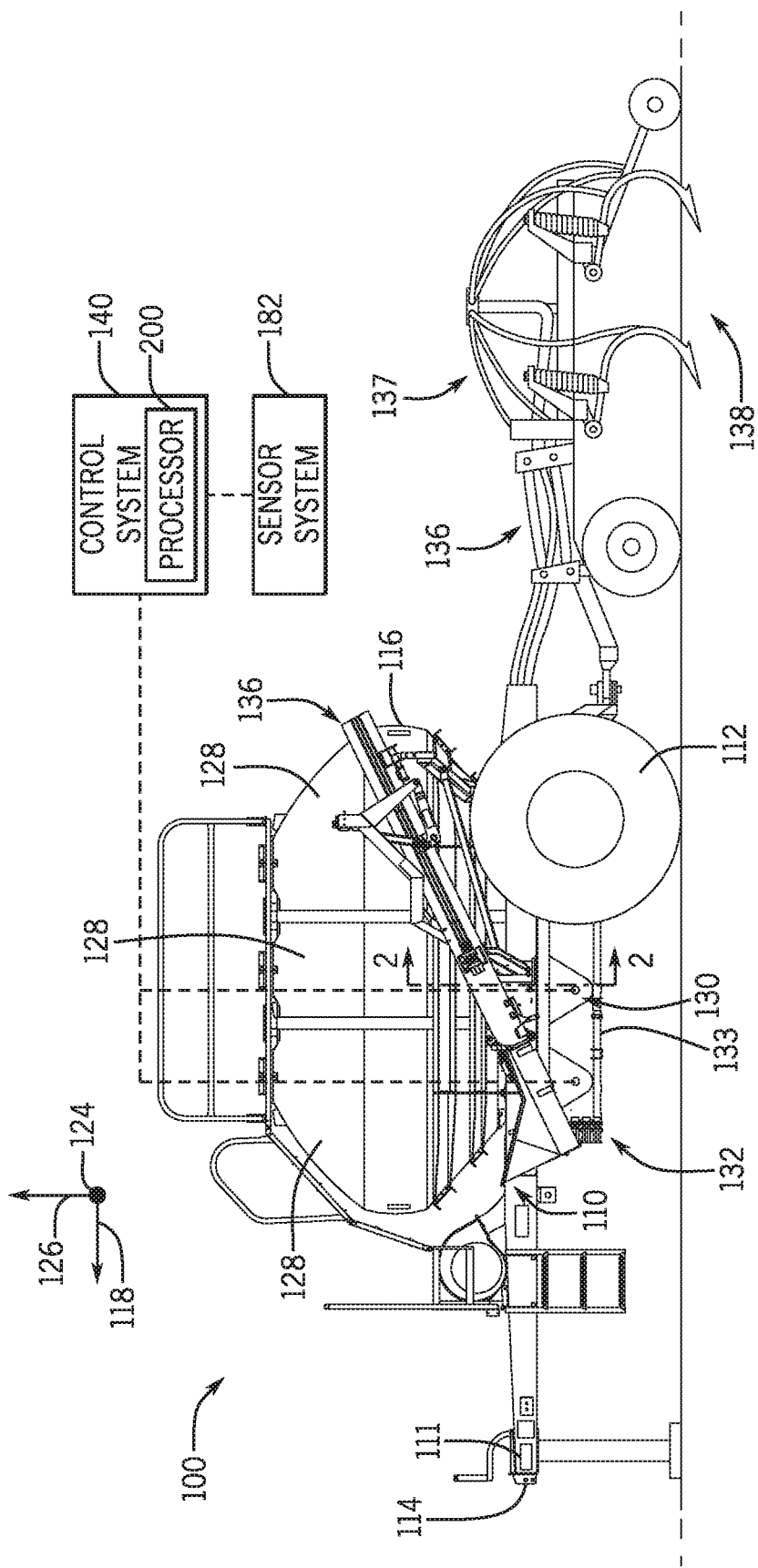
FIG. 1 is a side view of a work vehicle according to example embodiments of the present disclosure.

The following describes one or more example embodiments of a commodity metering system for a work vehicle (e.g., an air cart, commodity cart, etc.), its control system(s), and the methods for operating the same, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicle described herein is merely one exemplary embodiment of the present disclosure.

Conventional techniques related to signal processing, data transmission, signaling, control, and other functional aspects of the systems (and the individual operating components of the systems) may not be described in detail herein for brevity. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As will be appreciated by one skilled in the art, certain aspects of the disclosed subject matter may be embodied as a method, system, or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that may contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Aspects of certain embodiments are described herein may be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block (or otherwise described herein) may occur out of the order noted in the figures. For example, two blocks shown in succession (or two operations described in succession) may, in fact, be executed substantially concurrently, or the blocks (or operations) may sometimes be executed in the reverse order, depending upon the functionality involved. It will also be noted that each block of any block diagram and/or flowchart illustration, and combinations of blocks in any block diagrams and/or flowchart illustrations, may be implemented by special purpose hardware-based systems that perform the specified functions or acts, or combinations of special purpose hardware and computer instructions.

The following describes one or more example implementations of the disclosed work vehicle for metering and delivering a commodity to the soil, as shown in the accompanying figures of the drawings described briefly above. The work vehicle may include a metering system with a plurality of metering elements. The metering elements may comprise metering rollers in some embodiments. The metering elements may actuate (e.g., rotate) at variable output speeds. The work vehicle may also include a control system configured to control the metering elements individually and independently.

In some cases, the metering system may be calibrated to ensure that the metering elements are metering out the intended amount of commodity during operation. To calibrate the system, in some embodiments, the control system may independently operate the different metering elements under predetermined conditions (e.g., at a known speed, for a known number of revolutions, for a known amount of time, etc.). The control system may also obtain measurements (e.g., weights) of the commodity metered out by the individual metering elements. This information allows the system to quantify the performance of the individual metering elements. Data from this calibration method can be gathered and stored. This calibration method may be repeated. Then, the control system may determine calibration factors for each of the metering elements according to the measurements. Then, once the metering element has been calibrated, the control system may rely at least partly on the calibration factors for operating the metering elements individually. Accordingly, the metering system may operate with a high degree of accuracy.

Also, the following describes one or more features that facilitate calibration of the metering system. For example, a scale, load cell, or other measuring device may be included. In some embodiments, the scale may be mounted and supported on the work vehicle. A receptacle, such as a bag may be supported on the scale. Then, a user interface may be used to run a calibration program. During the program, the control system may automatically run the metering system through the calibration process. Specifically, the control system may individually operate the metering elements and automatically measure the resultant metered amounts of the commodity. Also, data may be gathered and recorded automatically. The scale may also automatically tare the weight of the receptacle. Thus, calibrating the metering system may be accomplished quickly and conveniently.

FIG. 1 illustrates a work vehicle 100 according to example embodiments of the present disclosure. In the illustrated embodiment, the work vehicle 100 may be towed by another vehicle, such as a tractor. In other embodiments, the work vehicle 100 of the present disclosure may be a self-propelled vehicle. In some embodiments, the work vehicle 100 may be an air cart or air drill. It will be appreciated that the illustrated work vehicle 100 is an example embodiment. One or more features of the present disclosure may be included on a different work vehicle, such as a planter, a commodity cart, or other work vehicle without departing from the scope of the present disclosure.

Generally, the work vehicle 100 may include a chassis 110 and a plurality of wheels 112. The chassis 110 may be a rigid or somewhat flexible frame that supports the components described in detail below. The wheels 112 may support the chassis 110 on terrain and enable movement of the vehicle 100 across the terrain. As shown, the chassis 110 may extend between a front end 114 and a rear end 116. The front end 114 may include a tow bar 111 for attaching the work vehicle 100 to a tractor or other towing vehicle. A tool 137 may be attached to the rear end 116. The tool 137 may include tillers, openers, or other implements for tilling, opening, or otherwise preparing the soil.

An axial direction 118 is indicated in FIG. 1 for reference purposes. It will be appreciated that a fore-aft axis of the work vehicle 100 (extending between the front end 114 and rear end 116) is parallel to the axial direction 118. A lateral direction 124 is also indicated in FIG. 1, and it will be appreciated that a lateral axis of the work vehicle 100 (extending between opposite sides of the vehicle 100) is parallel to the lateral direction 124. Furthermore, a vertical direction 126 is indicated in FIG. 1 for reference purposes.

The work vehicle 100 may include one or more commodity containers 128. The containers 128 may be supported on the chassis 110. The commodity containers 128 may contain seed, fertilizer, and/or another particulate or granular commodity. There may be any number of containers 128. In the illustrated embodiment, for example, there are four commodity containers 128, one of which is hidden from view.

Additionally, the work vehicle 100 may include at least one metering system 130. The metering system 130 may be a volumetric metering system. The metering system 130 may be disposed generally underneath the commodity container(s) 128. The work vehicle 100 may include individual metering systems 130 for different commodity containers 128 in some embodiments. The metering system(s) 130 may include at least one metering element (e.g., a roller, auger, etc.) for each commodity container 128 in some embodiments. As such, particles of the commodity within the container 128 may fall due to gravity toward the metering system 130. The metering system 130 may operate to meter out the commodity from the container 128 at a controlled rate as the vehicle 100 moves across the field.

The work vehicle 100 may also include an airflow system 132. The airflow system 132 may include a plurality of airflow structures 133 (e.g., lines, tubes, pipes, etc.) through which air flows. The airflow can be generated by a fan or other source. Particles of the commodity (metered out by the metering system 130) may fall into the airflow structures 133, and the air stream therein may propel the particles to a distribution system 136. At least part of the distribution system 136 may extend to the tool 137 and may include a plurality of hoses, lines, or other conduits that distribute the commodity to the soil. The tool 137 may include a ground system 138 with openers, tillers or other similar implements that prepare the soil for delivery of the seed, fertilizer, or other commodity delivered by the distribution system 136.

Moreover, the work vehicle 100 may include a control system 140. The control system 140 may include and/or communicate with various components of a computerized device, such as a processor 200, a data storage device, a user interface, etc. The control system 140 may be in communication with and may be configured for controlling the metering system 130, the airflow system 132, and/or other components of the work vehicle 100. The control system 140 may be wholly supported on the work vehicle 100, or the control system 140 may include components that are remote from the vehicle 100. The control system 140 may be in electronic, hydraulic, pneumatic, mechanical, or other communication with the metering system 130, the airflow system 132, etc.

The control system 140 may also be in communication with one or more sensors of a sensor system 182. The sensor system 182 may be configured to detect one or more conditions associated with operations of the work vehicle 100 and/or the metering system 130. The sensor system 182 may also provide signals to the processor 200 of the control system 140 that correspond to the detected condition. In some embodiments, the sensor system 182 may be wired to the processor 200. In other embodiments, the sensor system 182 may include one or more components that are wirelessly connected to the processor 200.

During operation of the work vehicle 100 (e.g., when towed by a tractor or other towing vehicle across a field), the control system 140 may control the metering system 130 (e.g., by controlled actuation of a motor or other actuator), which allows a controlled quantity of particles to pass into the airflow system 132 at a predetermined rate. The control system 140 may also control the fan or other air source for generating a continuous airstream that blows through the airflow system 132, receives the particles metered out from the metering system 130, and flows through the distribution system 136 to the soil.

Figure 2:
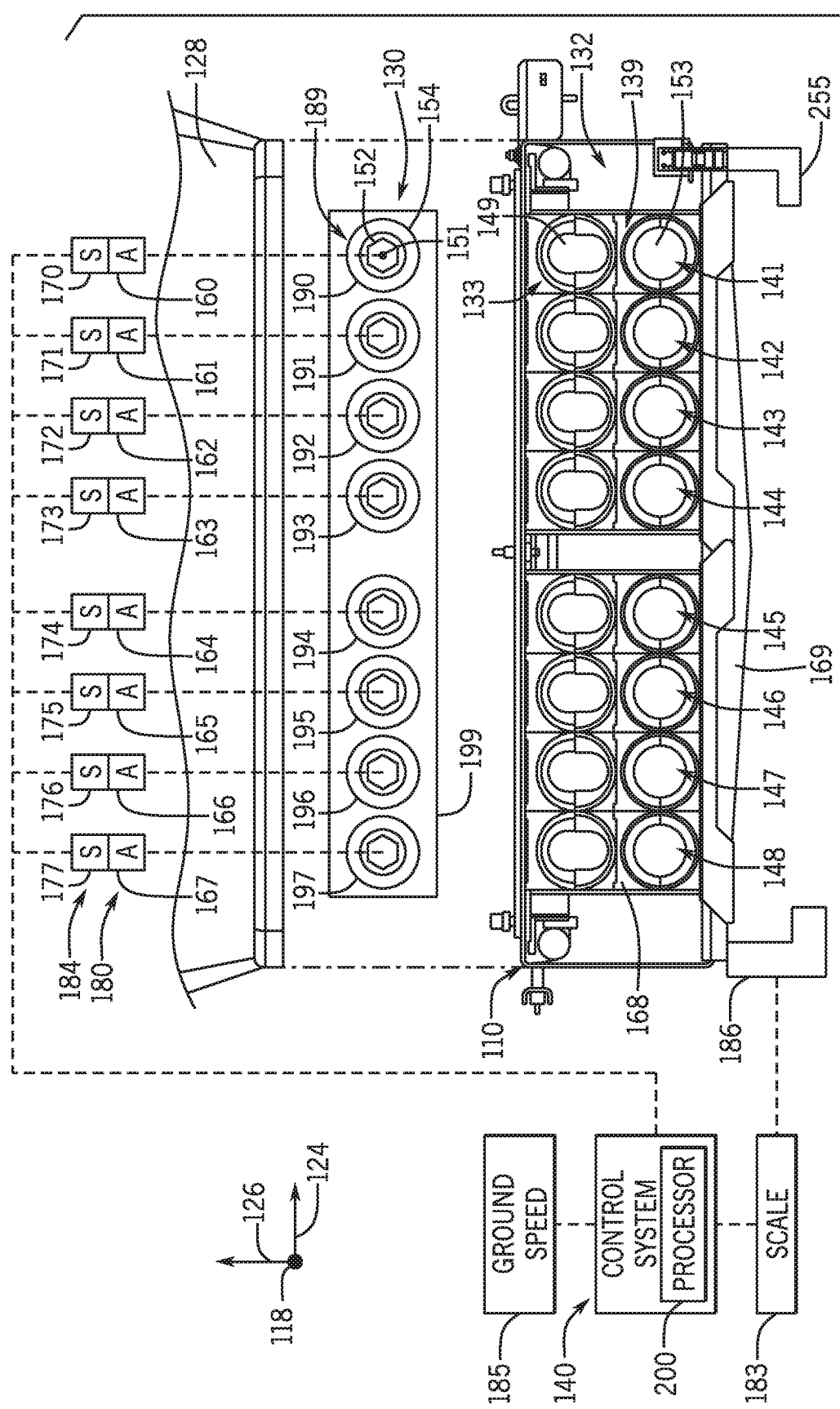
FIG. 2 is a schematic section view of a metering system of the work vehicle taken along the line 2-2 of FIG. 1.

Referring now to FIG. 2, the metering system 130, the airflow system 132, and the control system 140 will be discussed in greater detail according to example embodiments. It will be appreciated that certain parts of the work vehicle 100 are hidden for clarity.

As shown, the metering system 130 may include a plurality of metering elements 189. There may be any number of metering elements 189. As shown in the embodiment of FIG. 2, for example, the plurality of metering elements 189 may include a first metering element 190, a second metering element 191, a third metering element 192, a fourth metering element 193, a fifth metering element 194, a sixth metering element 195, a seventh metering element 196, and an eighth metering element 197. The plurality of metering elements 189 may be supported by a metering support structure 199, which may be supported by the chassis 110 of the vehicle 100. The metering elements 189 may also be substantially aligned along the lateral direction 124 across the work vehicle 100. Also, in some embodiments, two or more of the metering elements 189 may receive commodity from the same commodity container 128. In the embodiment shown, the first through eighth metering elements 190-197 are configured to meter commodity from the same container 128. This configuration may be common to another commodity container 128 of the work vehicle 100.

In some embodiments, the metering elements 189 may be substantially similar to each other. The first metering element 190 will be discussed in detail according to example embodiments, and it will be appreciated that the description may apply to the other metering elements 189.

The first metering element 190 may comprise a rotatable metering element (e.g., a metering roller) that provides volumetric metering as it rotates about an axis of rotation 151. The axis of rotation 151 may be directed substantially along the axial direction 118 of the vehicle 100 as shown in FIG. 2, or the axis of rotation 151 may be directed in other directions. The first metering element 190 may include one or more wheels 154 that are supported on a shaft 152. The wheels 154 may include a plurality of projections that project radially away from the axis of rotation 151. Thus, the first metering element 190 may be a fluted roller in some embodiments. The metering element 190 could also be configured as an auger or configured otherwise in some embodiments of the present disclosure. Although not specifically shown, the first metering element 190 may be supported for rotation by the metering support structure 199 by a bearing. During operation, particles of commodity may fall from the container 128 toward the metering element 190.

The metering element 190 may rotate and meter out a controlled amount of the commodity toward the airflow system 132.

The metering system 130 may also include a plurality of actuators 180, which are schematically illustrated and indicated with an "A" in FIG. 2. The actuators 180 may be of any suitable type, such as electric motors in some embodiments. However, it will be appreciated that the actuators may be a hydraulic actuators or other types without departing from the scope of the present disclosure. In some embodiments, the metering elements 189 may include a respective actuator 180. As such, the metering elements 189 may be individually and independently actuated relative to the others. More specifically, the metering system 130 may include a first actuator 160 configured for actuating (i.e., rotating) the first metering element 190. Likewise, a second actuator 161 may be configured for actuating the second metering element 191, a third actuator 162 may be configured for actuating the third metering element 192, a fourth actuator 163 may be configured for actuating the fourth metering element 193, a fifth actuator 164 may be configured for actuating the fifth metering element 194, a sixth actuator 165 may be configured for actuating the sixth metering element 195, a seventh actuator 166 may be configured for actuating the seventh metering element 196, and an eighth actuator 167 may be configured for actuating the eighth metering element 197. As will be discussed, in some situations, the metering elements 190-197 may operate simultaneously, but at different individual speeds. In other situations, the metering elements 190-197 may operate one-at-a-time. This capability allows the metering elements 190-197 to be individually calibrated for more accurate application of the commodity.

FIG. 2 also illustrates portions of the airflow system 132 of the work vehicle 100. The airflow system 132 may include a manifold 139. The manifold 139 may be attached to and supported by the chassis 110 of the vehicle 100. The manifold 139 may be disposed generally underneath the metering elements 190-197 as shown in FIG. 2. The manifold 139 may include a plurality of the airflow structures 133 (e.g., pipes, tubes, lines, conduits, etc.) mentioned above.

As shown in FIG. 2, the airflow structures 133 may be arranged in a plurality of pairs, and may define respective flow passages, such as a first pair of passages 141, a second pair of passages 142, a third pair of passages 143, a fourth pair of passages 144, a fifth pair of passages 145, a sixth pair of passages 146, a seventh pair of passages 147, and an eighth pair of passages 148. The first pair of passages 141 may be configured to receive commodity metered from the first metering element 190. The second through eighth pairs of passages 142-148 may be configured to receive commodity metered from the second through eighth metering elements 191-198, respectively.

As an example, the first pair of passages 141 may include an upper passage 149 and a lower passage 153. The upper passage 149 and the lower passage 153 may extend substantially along the axial direction 118 so as to be substantially parallel to the axis of rotation 151 of the metering elements 190-197. The upper passage 149 and the lower passage 153 may be fluidly connected to the fan or other air source to receive airflow therefrom. The upper passage 149 and the lower passage 153 may also include a respective venturi tube, which accelerates the airflow through the passages 149, 153.

Furthermore, the manifold 139 may define a path for the commodity to travel from the metering elements 189 to the upper passages 149 and the lower passages 153. In some embodiments, the airflow system 132 may have a plurality of selectable configurations. In a first configuration, commodity particles moving from the metering elements 189 enter the upper passages 149 instead of the lower passages 153. In a second configuration, commodity particles moving from the metering elements 189 enter both the upper passages 149 and the lower passages 153. Accordingly, particles of the commodity that have been metered out by the metering system 130 may enter the airstream flowing through the upper passages 149 and/or the lower passages 153. The particles may accelerate through the airflow system 132, through the distribution system 136, and may be ultimately delivered to the soil.

Additionally, the manifold 139 may include a first structure 168 and a second structure 169. The first structure 168 may be fixed to the chassis 110 and may define and/or support the airflow structures 133. The second structure 169 may be removably attached to the first structure 168. For example, the second structure 169 is shown attached in FIG. 2, and the second structure 169 is shown removed in FIG. 3. When the second structure 169 is attached to the first structure 168 (FIG. 2), the pathway from the metering system 130 to the airflow structures 133 may be continuous. However, when the second structure 169 is removed from the first structure 168 (FIG. 3), the pathway may be open, allowing commodity to fall from the metering system 130 without entering the airflow structures 133. Instead, the commodity may fall from the metering system 130 and bypass the airflow structures 133. As such, the user may collect and measure the amount of commodity metered from the metering system 130. This may be useful, for example, when calibrating the metering system 130.

The work vehicle 100 may also include a receptacle 250 as shown schematically in FIG. 3. The receptacle 250 may be used to collect commodity falling from the metering system 130 when the second structure 169 of the manifold 139 is removed. The receptacle 250 may include a flexible bag 252 made of a porous or breathable material and may include an open end 257. The receptacle 250 may include one or more handles, hooks, liners, or other feature for removably attaching the bag 252 to the work vehicle 100, below the metering system 130. When attached, the open end 257 of the bag 252 may be wide enough to collect output from multiple ones (e.g., each) of the metering elements 190-197.

With reference to FIGS. 2 and 3, the sensor system 182 will be discussed in greater detail. In some embodiments, the sensor system 182 may include a plurality of actuator sensors 184, such as a first actuator sensor 170, a second actuator sensor 171, a third actuator sensor 172, a fourth actuator sensor 173, a fifth actuator sensor 174, a sixth actuator sensor 175, a seventh actuator sensor 176, and an eighth actuator sensor 177. The first actuator sensor 170 may be configured to detect the speed (e.g., an angular speed) of the first actuator 160 and/or the first metering element 190. Similarly, the second actuator sensor 171 may be configured for detecting the speed of the second actuator 161 and/or the second metering element 191; the third actuator sensor 172 may be configured for detecting the speed of the third actuator 162 and/or the third metering element 192; the fourth actuator sensor 173 may be configured for detecting the speed of the fourth actuator 163 and/or the fourth metering element 193; the fifth actuator sensor 174 may be configured for detecting the speed of the fifth actuator 164 and/or the fifth metering element 194; the sixth actuator sensor 175 may be configured for detecting the speed of the sixth actuator 165 and/or the sixth metering element 195; the seventh actuator sensor 176 may be configured for detecting the speed of the seventh actuator 166 and/or the seventh metering element 196; and the eighth actuator sensor 177 may be configured for detecting the speed of the eighth actuator 167 and/or the eighth metering element 197.

At least one of the actuator sensors 184 may comprise an electrical sensor, an optical sensor, or other type without departing from the scope of the present disclosure. The actuator sensors 184 may also be in communication with the processor 200 and may send signals to the processor 200 that correspond to the detected speeds. Accordingly, in some embodiments, the control system 140 may individually and independently control the actuators 160-167 and may receive associated feedback from the sensors 170-177 for closed-loop control of the metering elements 190-197.

The sensor system 182 may additionally include at least one ground speed sensor 185. The ground speed sensor 185 may detect the ground speed of the work vehicle 100. Thus, the ground speed sensor 185 may comprise a speedometer in some embodiments. The ground speed sensor 185 may be in communication with the engine control system of a vehicle (e.g., a tractor) that is towing the work vehicle 100 to detect the ground speed of the work vehicle 100. Also, in some embodiments, the ground speed sensor 185 may be operatively connected to a wheel axle, a mechanical transmission, or other component for detecting the ground speed of the work vehicle 100. During seeding operations, for example, the work vehicle 100 may be towed across a field at some speed (i.e., a ground speed), which is detected by the ground speed sensor 185. The sensor 185 may provide a corresponding signal to the control system 140, and the control system 140 may, in turn, generate control signals for operating the actuators 160-167 at controlled speeds. Accordingly, the speeds of the actuators 160-167 may be controlled based, at least partly, on the ground speed of the vehicle 100.

Additionally, the sensor system 182 may include one or more sensors configured to detect and measure an amount of commodity metered out by the metering system 130. For example, the sensor system 182 may comprise a scale system 183. The scale system 183 may have various configurations without departing from the scope of the present disclosure. In some embodiments, the scale system 183 may be electronic and may weigh the commodity metered out by the metering system 130. Also, the scale system 183 may output an electric signal corresponding to the detected weight to the processor 200 of the control system 140. The scale system 183 may be used for calibrating the metering system 130.

In some embodiments, the scale system 183 may include one or more electronic load cells 186 that detect a weight load of the receptacle 250 and any commodity contained therein. In the embodiment shown in FIG. 3, for example, there is a load cell 186 included on one lateral side of the vehicle 100. The receptacle 250 may removably attach to the chassis 110 via the load cell 186. It will be appreciated that the load cell 186 may be attached to the chassis 110 and that the receptacle 250 may removeably attach to the load cell 186. In other embodiments, the load cell 186 may be attached to the receptacle 250, and the load cell 186 may removably attach to the chassis 110 of the vehicle 100. The opposite lateral side of the work vehicle 100 may include one or more brackets 255 that attach the receptacle 250 to the chassis 110. The bracket 255 may support the receptacle 250, but may not be configured for detecting a weight load. It will be appreciated, however, that there may be any number of load cells 186. In some embodiments, the receptacle 250 may be supported on the vehicle 100 exclusively by load cells 186.

In some embodiments (e.g., in embodiments in which there are one or two load cells 186 supporting the receptacle 250) the processor 200 may process the signal(s) from the load cell(s) 186 for calculating the weight of the receptacle 250 and commodity therein using programmed logic. For example, the processor 200 may rely on known mathematical equations for detecting receptacle/commodity weight. More specifically, a first lateral distance 251 is indicated from the load cell 186 to an area below the first metering element 190. A second distance 253 is also indicated from the load cell 186 to an area below the second metering element 191. It may be assumed that commodity metered from the first metering element 190 will apply a load to the load cell 186 with a moment arm approximately equal to the first distance 251. Likewise, it may be assumed that commodity metered from the second metering element 191 will apply a load to the load cell 186 with a moment arm approximately equal to the second distance 253. As such, the load detected by the load cell 186 may be calculated (e.g., similar to beam load calculations) for each metering element 190, 191 with the processor 200 accounting for the different distances 251, 253 at which the commodity is located. The loads applied by the remaining metering elements 192-197 may be substantially similar.

In additional embodiments, there may be two, three, or more load cells 186 that each operably attaches the receptacle 250 to the chassis 110. In these embodiments, the weights detected by the plural load cells 186 may be summed to obtain the total weight of the receptacle 250 and any commodity contained therein.

Thus, the scale system 183 may be configured for weighing the receptacle 250 and the commodity collected therein in a quick and convenient manner. In additional embodiments, the scale system 183 may be remote from the metering system 130 of the work vehicle 100 and/or the receptacle 250.

Figure 4:
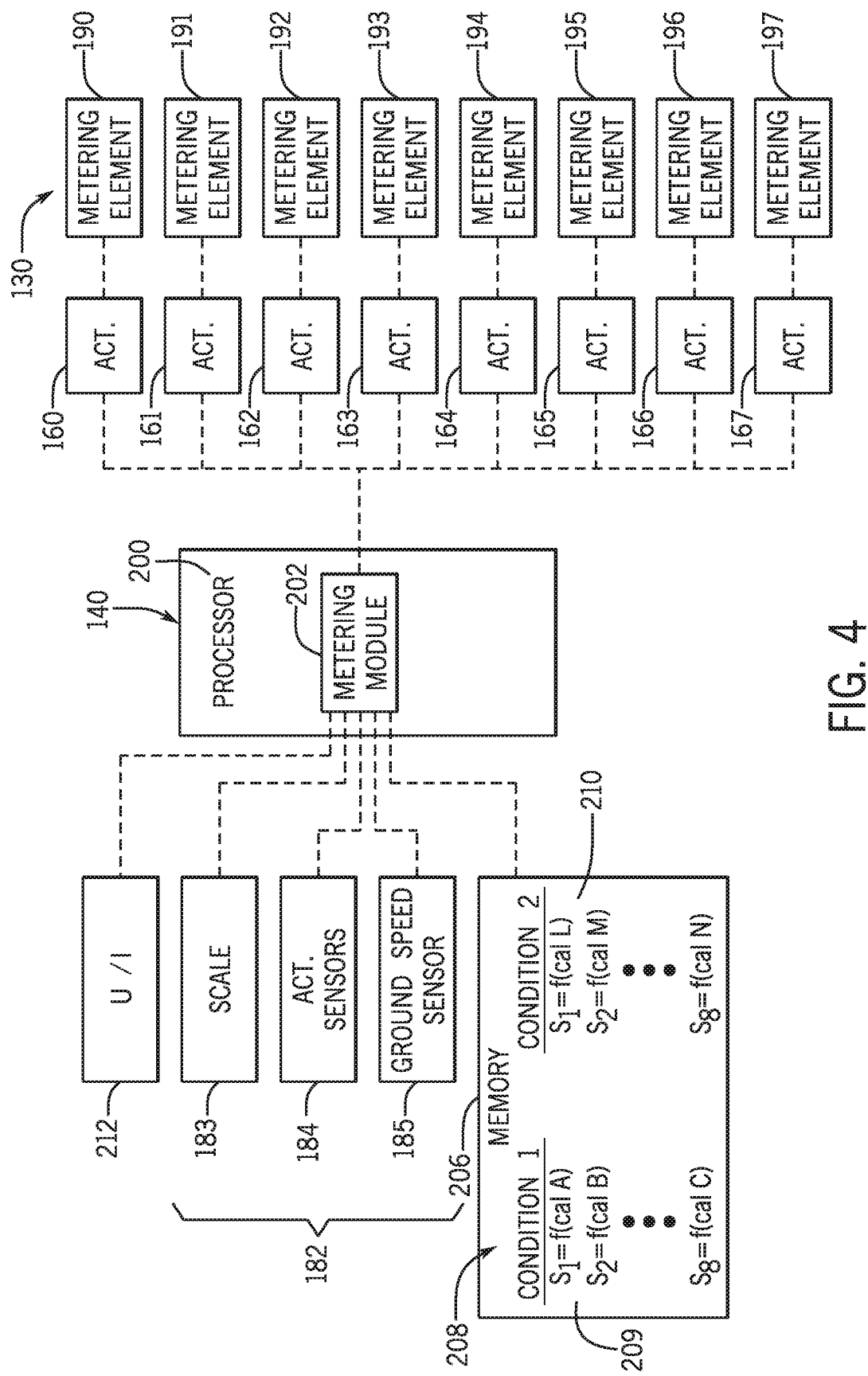
FIG. 4 is a schematic diagram of a control system of the work vehicle of FIG. according to example embodiments.

The control system 140 is shown in more detail in FIG. 4 according to example embodiments. It will be understood that FIG. 4 is a simplified representation of the control system 140 for purposes of explanation and ease of description, and FIG. 4 is not intended to limit the application or scope of the subject matter in any way. Practical embodiments of the control system 140 may vary from the illustrated embodiment without departing from the scope of the present disclosure. Also, the control system 140 may include numerous other devices and components for providing additional functions and features, as will be appreciated in the art.

The control system 140 may include the processor 200 as mentioned above. The processor 200 may comprise hardware, software, and/or firmware components configured to enable communications and/or interaction between the sensor system 182, the actuators 160-167, a memory element 206, and a user interface (U/I) 212. The processor 200 may also perform additional tasks and/or functions described in greater detail below. Depending on the embodiment, the processor 200 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processor 200 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processor 200 includes processing logic that may be configured to carry out the functions, techniques, and processing tasks associated with the operation of the control system 140. Furthermore, the steps of a method or algorithm described in connection with the embodiments disclosed herein may be embodied directly in hardware, in firmware, in a software module executed by the processor 200, or in any practical combination thereof.

The processor 200 may include a metering module 202. The metering module 202 may be configured for calibrating the metering system 130. The metering module 202 may also be configured for determining operating conditions of the metering system 130. As shown, the metering module 202 may be in communication with the sensor system 182, the U/I 212, and the memory element 206.

The U/I 212 may be of any suitable type. In some embodiments, the U/I 212 may include one or more input devices with which the user may enter user commands. For example, in some embodiments, the U/I 212 may include a keyboard, a mouse, a touch-sensitive surface, a stylus, and/or another input device. The U/I 212 may also include one or more output devices for providing output to the user. In some embodiments, the U/I 212 may include a display, an audio speaker, a printer, a tactile feedback device, or the like. Accordingly, with the U/I 212, the user may input the type of commodity that is loaded within the commodity container 128, a target ground speed of the vehicle 100, and/or the desired application rate (e.g., measured in pounds of commodity per acre) for the particular commodity. The U/I 212 may also output a message, alert, or other information to the user regarding operation of the metering system 130.

The memory element 206 may be realized as RAM memory, flash memory, EPROM memory, EEPROM memory, registers, a hard disk, a removable disk, a CD-ROM, or any other form of storage medium known in the art. In this regard, the memory element 206 can be coupled to the processor 200 such that the processor 200 can read information from, and write information to, the memory element 206. In the alternative, the memory element 206 may be integral to the processor 200. As an example, the processor 200 and the memory element 206 may reside in an ASIC.

In some embodiments, the memory element 206 may include one or more datasets 208 stored thereon. In some embodiments, at least one dataset 208 may be used for determining target operating speeds (indicated as "S1" through "S8") for the different actuators 160-167 of the metering system 130.

There may be any number of datasets 208 stored on the memory element 206. The datasets 208 may include stored mathematical functions, calibration curves, look-up tables, mathematical models, or other tools. The datasets 208 may be created and saved, generated, compiled, etc., from testing data, from user programming of the control system 140, or otherwise. As will be discussed, the metering module 202 of the processor 200 may rely on at least one of the datasets 208 to ultimately determine how fast to rotate the individual metering elements 190-197 during planting, seeding, or related operations. More specifically, the metering module 202 may determine the angular speed of the metering elements 150 based on: (a) the desired application rate for the commodity; (b) the ground speed of the vehicle 100; and/or (c) a predetermined calibration factor.

As shown, there may be a first dataset 209 and a second dataset 210. The first dataset 209 may be associated with first operating conditions of the vehicle 100 (identified as "Condition 1"), and the second dataset 210 may be associated with second operating conditions of the vehicle 100 ("Condition 2"). In the first dataset 209, the target speed for the first metering element 190 ("S1") is shown as a function of a first calibration factor ("Cal A"). Similarly, the target speed for the second metering element 191 ("S2") is shown as a function of a second calibration factor ("Cal B"). The datasets 209, 210 may also represent target speeds for the other metering elements 192-197 as a function of respective calibration factors as well.

The calibration factors may be a respective mathematical expression, model, function, graph, look-up table, function, etc. that expresses how the speeds of the metering elements 190-197 affect the commodity output by the metering system 130. In some embodiments, the calibration factor establishes an approximate mass of commodity that is dispensed per revolution of the metering elements 190-197. Since each metering element 190-197 may have a unique calibration factor, each of the metering elements 190-197 may be independently controlled and calibrated.

Figure 5:
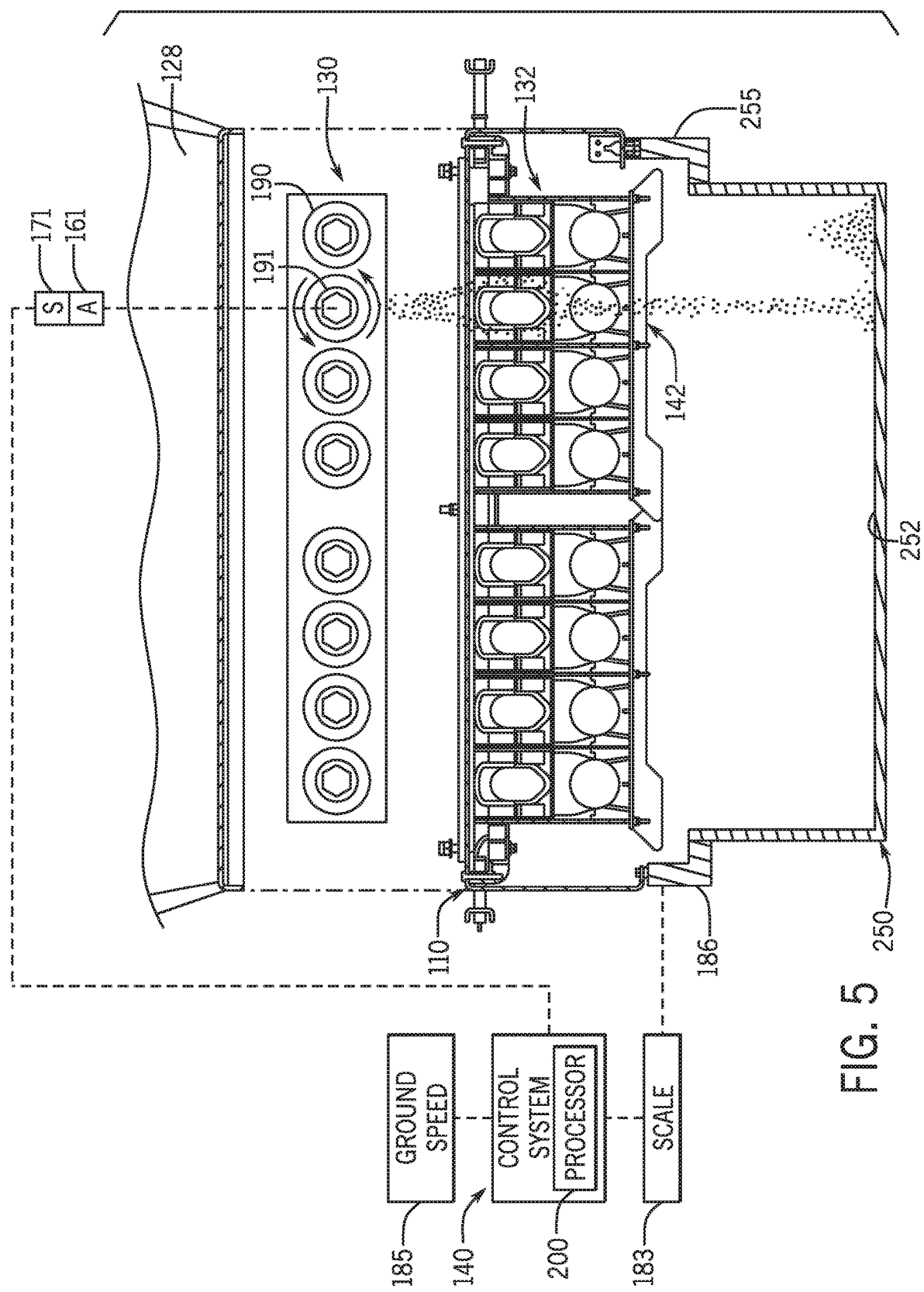
FIG. 5 is a schematic section view of the metering system of FIG. 2 shown metering a commodity into the receptacle.
Figure 6:
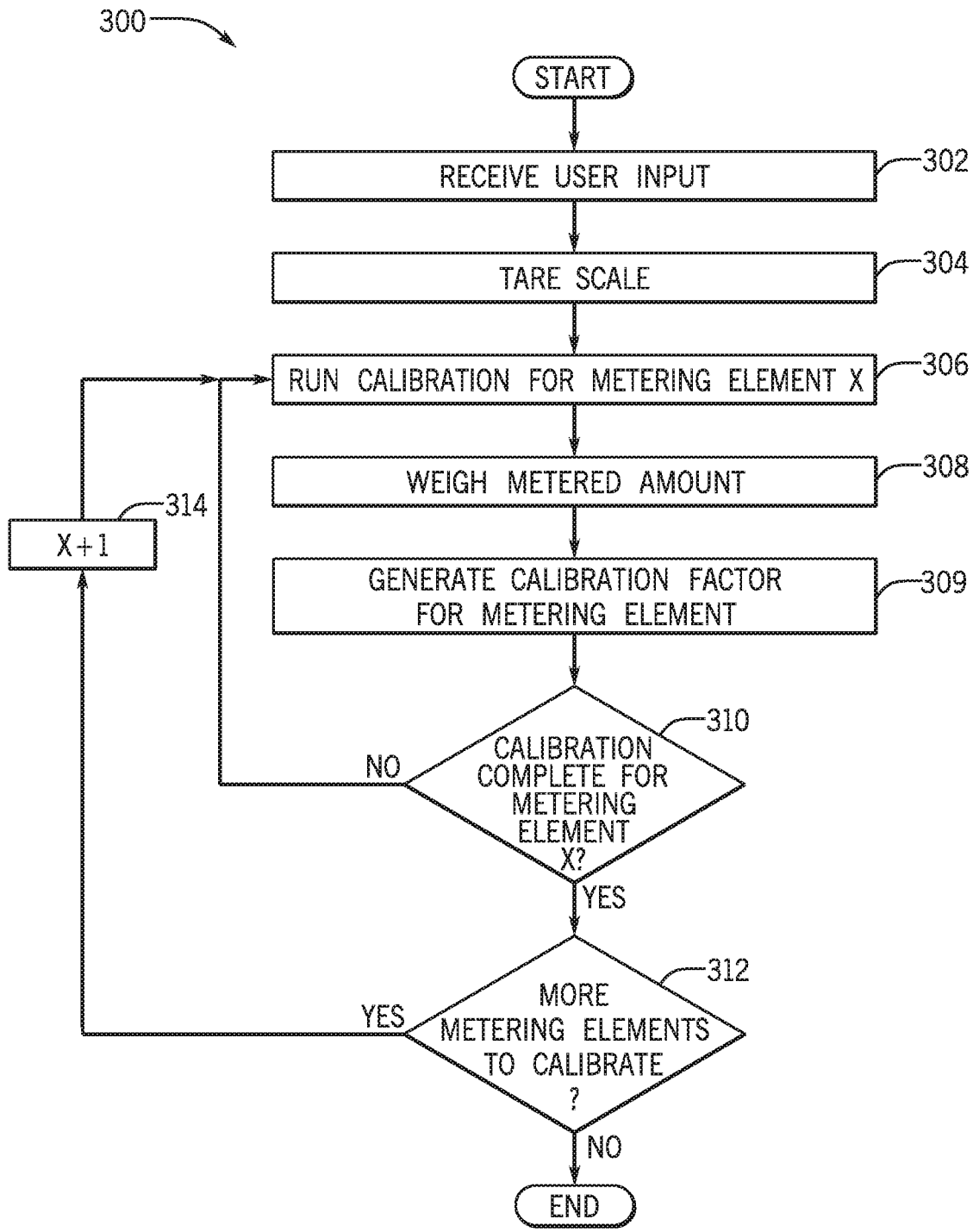
FIG. 6 is a flowchart illustrating a method of calibrating the metering system of the work vehicle of FIG. 1.

The processor 200 of the control system 140 may generate the calibration factors during a calibration method 300, as represented in FIGS. 5 and 6 according to example embodiments. The calibration method 300 may be completed quickly and conveniently and may accurately calibrate the individual metering elements 190-197.

Figure 3:
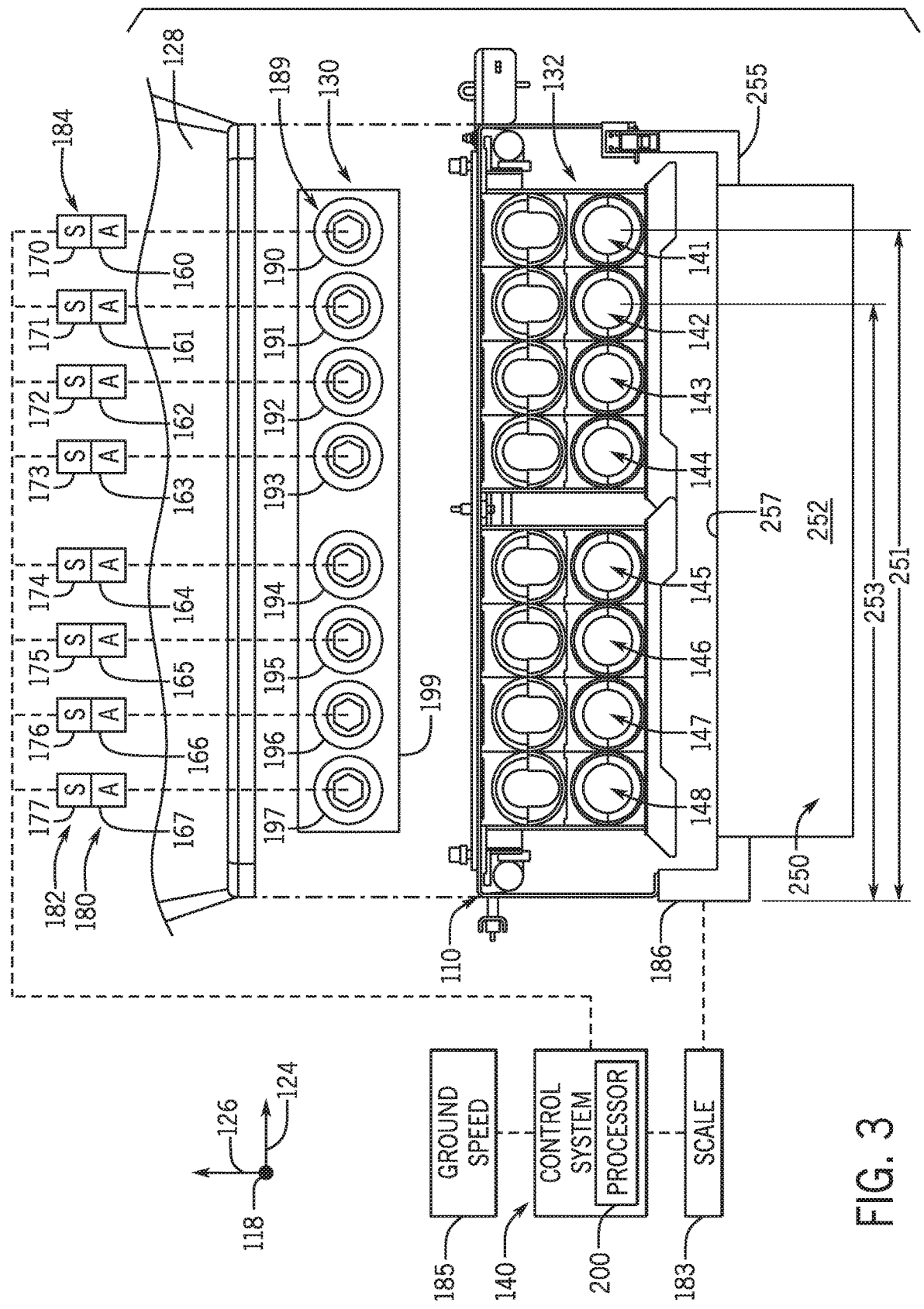
FIG. 3 is a schematic section view of the metering system of FIG. 2 with a receptacle attached.

Before the method 300 begins, the user may remove the second structure 169 of (FIG. 2) of the manifold 139 from the first structure 168. Then, the receptacle 250 may be hung from the work vehicle 100, for example, as shown in FIG. 3. Next, the user may initiate the calibration method 300.

In some embodiments, the method 300 may begin at 302. Specifically, the user may utilize the U/I 212 and input a user command to initiate the calibration process. The user may also input the type of commodity (e.g., seed-type, etc.) that will be metered through the metering system 130 during the calibration method 300. Also, the user may input the date, time, weather conditions, or other information.

Then, at 304, the processor 200 may tare the scale system 183 such that the weight of the receptacle 250 can be disregarded when weighing commodity therein. Specifically, the scale system 183 may weigh the empty receptacle 250 to obtain the receptacle weight. In some embodiments, the scale system 183 may be zeroed with the receptacle 250 still attached such that the receptacle weight is disregarded during future weight measurements. In other embodiments of 304, the weight of the receptacle 250 obtained at 304 may be saved in the memory element 206 so that the processor may subtract the detected receptacle weight from future weight measurements.

Next, at 306, the processor 200 may run a first calibration routine for one of metering elements 190-197. For example, the processor 200 may run the first calibration routine for the first metering element 190. Thus, the processor 200 may send commands to the first actuator 160 to rotate the first metering element 190 under predetermined operating parameters (e.g., at a predetermined speed, for a predetermined amount of time, for a predetermined number of revolutions, etc.). As a result, the first metering element 190 may meter out a first amount of the commodity into the receptacle 250. It is noted that the second through eighth metering elements 191-197 may remain stationary during this operation so that only the first metering element 190 meters the commodity to the receptacle 250.

Subsequently, at 308, the processor 200 may prompt the scale system 183 to detect the weight of the commodity metered into the receptacle 250 during this first calibration routine. The scale system 183 may send a signal corresponding to the detected weight to the processor 200, and the weight data may be saved in the memory element 206. The method 300 may continue at 309.

At 309, the processor 200 may generate calibration data for the first metering element 190 by correlating the weight of the commodity (obtained at 308) with the operating parameters (angular speed, number of revolutions, etc.) of this first calibration routine. This calibration data may be saved in the memory element 206.

Next, at 310, the processor 200 may determine whether there have been enough calibration routines performed for the first metering element 190 to ensure accuracy. In some embodiments, the metering module 202 may be preprogrammed to perform at least three calibration routines. In the present example, there has only been one operation; therefore, the processor 200 makes a negative determination at 310, and the method 300 loops back to 306.

Another calibration routine for the first metering element 190 may be performed with the first metering element 190. Then, at 308, the processor 200 may prompt the scale system 183 to detect the weight of the commodity metered into the receptacle 250 during this second routine. In some embodiments, the processor 200 may subtract the first weight measurement (obtained at the first occurrence of 308) and save the difference (i.e., the second measurement) in the memory element 206.

Again at 309, the processor 200 may update the calibration data for the first metering element 190. The method 300 may continue at 310. Here, there have been only two calibration routines. Therefore, the method 300 may loop back to 306, and another calibration routine may be performed for the first metering element 190. Then, at 308, the processor 200 may prompt the scale system 183 to weigh the amount of commodity metered into the receptacle 250 during this third calibration routine. In some embodiments, the processor 200 may subtract the second weight measurement (obtained at the second occurrence of 308) and save the difference (i.e., the third measurement) in the memory element 206.

Next at 309, the metering module 202 may again update the calibration data for the first metering element 190 in memory. The method 300 may continue at 310. In this example, there have been three calibration routines performed for the first metering element 190. As stated, the processor 200 may be preprogrammed to perform three calibration routines. Therefore, the processor 200 may make an affirmative determination at 310, and the method 300 may continue to 312. At this point, the calibration factor for the first metering element 190 has been generated and saved in the memory element 206.

At 312, the processor 200 may determine whether there are more metering elements to calibrate. In the current example, the second through eighth metering elements 191-197 need calibrating; therefore, an affirmative determination is made at 312, and the method continues at 314. The variable X may be incremented by one, such that the calibration routine may be performed independently for the second metering element 191, and the method 300 may loop back to 306.

Back at 306, the processor 200 may run a first calibration routine for the second metering element 191. Thus, the processor 200 may send commands to the second actuator 161 to rotate the second metering element 191 under predetermined operating parameters (e.g., at a predetermined speed, for a predetermined amount of time, for a predetermined number of revolutions, etc.). In some embodiments, the commodity metered out by the second metering element 191 may be added to the receptacle 250 along with the previously collected commodity as illustrated in FIG. 5. The method 300 may continue at 308 such that the scale system 183 measures the newly-added amount. As above, the processor 200 may subtract the weight of the commodity previously metered out by the first metering element 190 to obtain the weight of commodity metered out by the second metering element 191. Next, at 309, the calibration data for the second metering element 191 may be saved in the memory element 206.

Then, at 310, the processor 200 may determine whether there are more calibration routines to be performed. Similar to the calibration routine for the first metering element 190, the metering module 202 may be preprogrammed to perform at least three calibration routines for the second metering element 191 to ensure accuracy of the calibration. Thus, in the current example, the processor 200 may make a negative determination at 310, and the method 300 may loop back to 306. A second, third, and more calibration routines may then be performed, and the calibration data for the second metering element 191 may be generated and compiled to generate the calibration factor for the second metering element 191 as the method 300 cycles from 306 through 310 and back.

Once the calibration routines have been completed for the second metering element 191 (affirmative determination at 310), the method 300 may continue at 312. In the current example, the control system 140 may conduct the calibration routines for the third metering element 192 and generate the third calibration factor as the method 300 cycles from 306 through 310 and back. Calibration factors for the fourth metering element 193, the fifth metering element 194, the sixth metering element 195, the seventh metering element 196, and the eighth metering element 197 may be generated in the same fashion as the method 300 cycles from 306 through 314.

Eventually, at 312, the processor 200 may determine that calibration factors have been generated for each of the metering elements 190-197 of the work vehicle 100 (negative determination at 312). Accordingly, the method 300 may terminate.

In the embodiment of the method 300 discussed above, multiple calibration routines are performed for the first metering element 190, then multiple calibration routines are performed for the second metering element 191, and so on in sequence until calibration factors are generated for each metering element 190-197. However, this sequence may vary without departing from the scope of the present disclosure. For example, the control system 140 may perform a calibration routine for the first metering element 190, then perform a calibration routine for the second metering element 191, then perform a calibration routine for the third metering element 192, and so on until a single calibration routine has been performed for each of the metering elements 190-197. Subsequently, the control system 140 may perform a second round of individual calibration routines for the metering elements 190-197, and then a third round of calibration routines for the metering elements 190-197.

The method 300 may vary in other ways as well. For example, the method 300 may be repeated for other metering elements 189 of other commodity containers 128 of the vehicle. For example, the method 300 may be repeated four times such that each of the metering elements 189 of the work vehicle 100 may be individually calibrated. In some embodiments, the commodity from the metering elements 189 may collect in the same receptacle 250.

In additional embodiments, the control system 140 may be configured to pause the method 300. This may be an automatic operation, or the method 300 may pause in response to a user command. When the method 300 is paused, the user may be able to detach the receptacle 250, empty the commodity in the receptacle 250 back into the container 128, reattach the receptacle 250, and continue the method 300. In some embodiments, the control system 140 may automatically continue the method 300 in response to a user input. The control system 140 may continue by taring the receptacle 250 and then proceeding with the method. The control system 140 may automatically continue the method 300 to completion in some embodiments.

The calibration method 300 of FIG. 6 may be repeated several times for different operating conditions (e.g., for different commodity types, under different weather conditions, etc.). Accordingly, calibration factors may be collected for different operating conditions of the work vehicle 100. Also, the calibration method 300 may be repeated each time the commodity container 128 is filled with the commodity since the commodity density may vary from load-to-load.

It will be appreciated that the calibration method 300 provides significant convenience and time savings for the user. Accordingly, the metering system 130 may be calibrated, for example, when the container 128 is first filled with a fresh batch of commodity. Then, the work vehicle 100 can be used for seeding, fertilizing, etc. with the metering system 130 operating according to the newly-generated calibration factors for that particular batch of commodity. Accordingly, the metering system 130 may accurately provide the desired application rate for the particular commodity. When new commodity is loaded into the container 128, the metering system 130 may be calibrated again using the method 300 such that the metering system 130 may operate according to a fresh calibration factor.

Once the calibration method 300 has terminated, the user may detach the receptacle 250 from the work vehicle 100 and empty the collected commodity back into the commodity container 128. Also, the user may reattach the second structure 169 to the first structure 168 such that the manifold 139 is configured as shown in FIG. 2.

Figure 7:
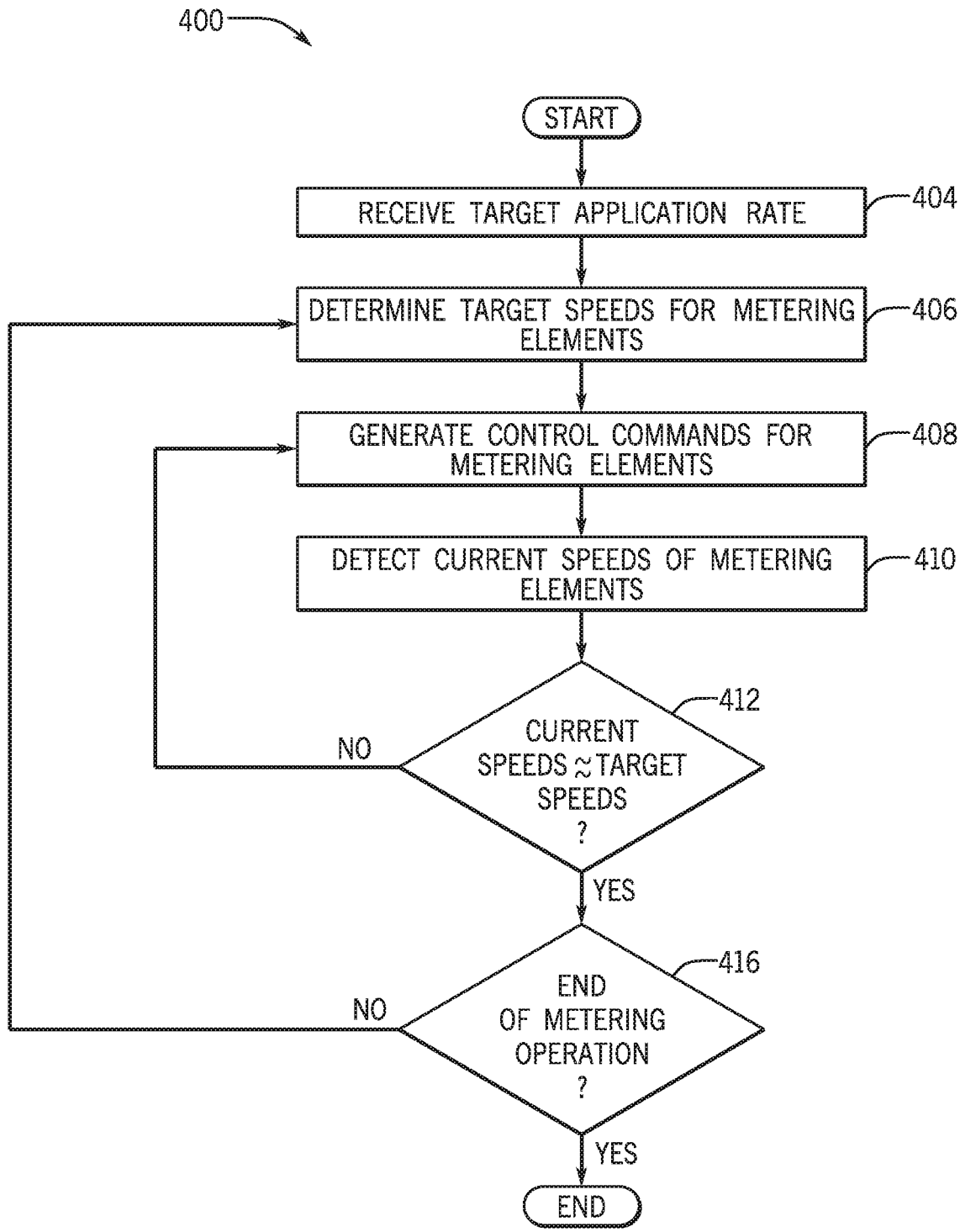
FIG. 7 is a flowchart illustrating a method of operating the metering system of the work vehicle of FIG. 1.

The control system 140 may operate the metering system 130 according to the calibration factors established using the method 300 and stored in the memory element 206. For example, the control system 140 may employ the method 400 of operating the metering system 130 shown in FIG. 7.

The method 400 may begin at 404, wherein the user may input the target (i.e., desired) application rate for the commodity. The user may decide on the target application rate based on the commodity type, based on the soil conditions, and other factors. The U/I 212 may be used to provide the inputs at 404 of the method 400. At this point, the work vehicle 100 may be ready to begin the seeding or planting operation.

Next, at 406, the processor 200 may determine target speeds for the metering elements 190-197. Specifically, the metering module 202 may receive a signal corresponding to the target application rate entered at 404. The metering module 202 may also receive a signal from the ground speed sensor 185 indicating the current ground speed condition of the vehicle 100. (The ground speed may be a set ground speed of the vehicle 100 or may be a variable ground speed.) Moreover, the metering module 202 may access the memory element 260 to obtain the calibration factors for the metering elements 190-197. From these inputs, the metering module 202 may determine the individual target speeds of the metering elements 190-197.

Once the target meter speed is established, the method 400 may continue at 408, wherein the metering module 202 may generate control commands for the actuators 160-167 of the metering system 130. The control commands may be generated and sent to the actuators 160-167 for simultaneously rotating the metering elements 190-197 at the individual speeds determined at 406. As such, the angular speeds of the metering elements 190-197 may be individually and independently controlled according to the calibration factors stored in the memory element 206.

Then, at 410, the current speeds of the metering elements 190-197 may be detected. For example, the actuator sensors 170-177 may detect the speeds of the respective metering elements 190-197 and send corresponding signals to the processor 200.

Next at 412 of the method 400, the processor 200 may determine whether the current speeds of the metering elements 190-197 (detected at 410) are approximately equal to the target speeds determined at 406. If any of the metering elements 190-197 are operating at an erroneous speed (as detected by the sensors 170-177), the processor 200 may make a negative determination at 412. Accordingly, the method 300 may loop back to 408, wherein the processor 200 may generate and send control commands to the actuators 160-167 for changing the speed of the metering element (s) 190-197 operating at an erroneous speed.

When, at 412, the processor 200 determines that the current speeds of the metering elements 190-197 are approximately equal to the speeds determined at 408, the method 400 may continue at 416. At 416, the control system 140 may determine whether the seeding/planting operation is complete. In many cases, the operation may continue for a significant time, and the speed of the work vehicle 100 may vary during the process. In this case, the method 400 may loop back to 406 and the metering module 202 may determine new target meter speeds for the metering elements 190-197. The metering module 202 may rely on the same calibration factors used previously; however, assuming that the ground speed of the vehicle 100 has changed, the target meter speeds for the metering elements 190-197 may change. The method 400 may continue as described above, until the metering operation is complete (i.e., 416 answered affirmatively). Then, the method 400 may terminate.

Accordingly, the metering system 130, the calibration method 300, and the operation method 400 may allow the work vehicle 100 to provide a substantially consistent and accurate application rate for the commodity. Also, the system 130 and methods 300, 400 may be substantially automated to provide convenience for the user.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A method of calibrating a metering system for a work vehicle with a commodity container, the metering system including a plurality of metering elements, the plurality of metering elements including a first metering element and a second metering element, the method comprising:
performing, by a control system having at least one processor, a calibration routine in which the first metering element and the second metering element independently meter a commodity from the commodity container through the metering system;
receiving, by the control system, a first measurement and a second measurement, the first measurement related to a first amount of the commodity independently metered through the metering system by the first metering element during the calibration routine, the second measurement related to a second amount of the commodity independently metered through the metering system by the second metering element during the calibration routine;
determining, by the control system, a first calibration factor for operating the first metering element based on the first measurement, and a second calibration factor for operating the second metering element based on the second measurement;
generating, by the control system, a first control command for the first metering element according to the first calibration factor, and a second control command for the second metering element according to the second calibration factor; and
operating, by the control system, the first metering element according to the first control command, and the second metering element according to the second control command;
wherein the calibration routine includes multiple first measurements, multiple second measurements, or consecutive first and second measurements from repeated rounds of metering commodity into one receptacle from the first metering element, the second metering element, or both of the first and second metering elements to obtain a combined amount of commodity in the receptacle; and
wherein the control system:
the first control command for the first metering element based on the first calibration factor as derived from the multiple first measurements of the combined amount of commodity in the receptacle,
the second control command for the second metering element based on the second calibration factor as derived from the multiple second measurements of the combined amount of commodity in the receptacle, or
respectively, the first and second control commands for the first and second metering elements based on the first and second calibration factors as derived from the consecutive first and second measurements of the combined amount of commodity in the receptacle.

2. The method of claim 1, wherein the first calibration factor relates to a first speed of the first metering element and the second calibration factor relates to a second speed of the second metering element.

3. The method of claim 1, wherein the first measurement is a first weight of the first amount and the second measurement is a second weight of the second amount.

4. The method of claim 1, further comprising receiving, by the control system, a target application rate input for the work vehicle;
wherein generating the first control command includes generating the first control command according to the target application rate input and the first calibration factor; and
wherein generating the second control command includes generating the second control command according to the target application rate input and the second calibration factor.

5. The method of claim 4, further comprising receiving, by the processor, a ground speed signal relating to a ground speed condition of the work vehicle;
wherein generating the first control command includes generating the first control command according to the target application rate input, the ground speed signal, and the first calibration factor; and
wherein generating the second control command includes generating the second control command according to the target application rate input, the ground speed signal, and the second calibration factor.

6. The method of claim 1, further comprising:
pausing, by the control system, the method;
receiving, by the control system, a user input to restart the method; and
restarting the method in response to the user input to restart the method.

7. The method of claim 1, wherein the first metering element includes a first metering roller, and a first actuator configured to actuate the first metering roller at a first variable angular speed;
wherein the second metering element includes a second metering roller, and a second actuator configured to actuate the second metering roller at a second variable angular speed;
wherein operating the first metering element according to the first control command includes varying the first angular speed of the first metering roller; and
wherein operating the second metering element according to the second control command includes varying the second angular speed of the second metering roller.

8. The method of claim 1, wherein performing the calibration routine includes operating the first metering element to dispense a first dispensed amount into the receptacle;
wherein performing the calibration routine includes operating the first metering element to dispense a second dispensed amount into the receptacle after the control system receives the first measurement such that the receptacle holds the combined amount;
further comprising operating, by the control system, a scale to weigh the first dispensed amount to obtain a first weight;
further comprising operating, by the control system, the scale to weigh the combined amount to obtain a combined weight;

further comprising subtracting, by the at least one processor, the first weight from the combined weight to identify a second weight; and wherein the first measurement corresponds to the first weight and wherein the second measurement corresponds to the second weight.

9. The method of claim 8, further comprising taring the scale system of a weight of the receptacle.

10. The method of claim 8, further comprising collecting the combined amount in the commodity container after dispensing the second dispensed amount in the receptacle.

11. A work vehicle comprising:
a commodity container;
a metering system that includes a first metering element and a second metering element;
a receptacle mounted with respect to the metering system to receive commodity from the commodity container metered from the first metering element and the second metering element;
a sensor system; and
a control system with at least one processor, the control system configured to:
perform a calibration routine in which the first metering element and the second metering element independently meter a commodity from the commodity container through the metering system into the receptacle;
receive a first measurement and a second measurement from the sensor system, the first measurement related to a first amount of the commodity independently metered through the metering system by the first metering element during the calibration routine, the second measurement related to a second amount of the commodity independently metered through the metering system by the second metering element during the calibration routine;
determine a first calibration factor for operating the first metering element based on the first measurement, and a second calibration factor for operating the second metering element based on the second measurement;
generate a first control command for the first metering element according to the first calibration factor, and a second control command for the second metering element according to the second calibration factor; and
operate the first metering element according to the first control command and the second metering element according to the second control command;
wherein the calibration routine includes multiple first measurements, multiple second measurements, or consecutive first and second measurements from repeated rounds of metering commodity into one receptacle from the first metering element, the second metering element, or both of the first and second metering elements to obtain a combined amount of commodity in the receptacle; and
wherein the control system generates:
the first control command for the first metering element based on the first calibration factor as derived from the multiple first measurements of the combined amount of commodity in the receptacle,
the second control command for the second metering element based on the second calibration factor as derived from the multiple second measurements of the combined amount of commodity in the receptacle, or
respectively, the first and second control commands for the first and second metering elements based on the first and second calibration factors as derived from the consecutive first and second measurements of the combined amount of commodity in the receptacle.

12. The work vehicle of claim 11, wherein the first calibration factor relates to a first speed of the first metering element and the second calibration factor relates to a second speed of the second metering element.

13. The work vehicle of claim 11, wherein the first measurement is a first weight of the first amount and the second measurement is a second weight of the second amount.

14. The work vehicle of claim 11, wherein the first metering element is configured to rotate at a first angular speed;
wherein the second metering element is configured to rotate at a second angular speed;
wherein the control system is configured to operate the first metering element according to the first control command by varying the first angular speed of the first metering roller; and
wherein the control system is configured to operate the second metering element according to the second control command by varying the second angular speed of the second metering roller.

15. The work vehicle of claim 14, wherein the first metering element includes a first actuator configured to actuate the first metering roller and the second metering element includes a second actuator configured to actuate the second metering roller;
wherein the first actuator is a first electric motor; and
wherein the second actuator is a second electric motor.

16. The work vehicle of claim 14, wherein at least one of the first metering element and the second metering element is configured to rotate about an axis of rotation; and
wherein the axis of rotation is substantially directed along a fore-aft direction of the vehicle.

17. The work vehicle of claim 11, wherein the sensor system includes a scale that is configured to weigh the first amount and the second amount;
wherein the control system is configured to generate the first calibration factor based at least partly on the weight of the first amount; and
wherein the control system is configured to generate the second calibration factor based at least partly on the weight of the second amount.

18. The work vehicle of claim 17, wherein the scale is supported by the work vehicle.

19. A method of calibrating a metering system for a work vehicle with a commodity container, the metering system including a plurality of metering elements, the plurality of metering elements including a first metering element and a second metering element, the method comprising:
performing, by a control system having at least one processor, at least one calibration routine including metering commodity from the commodity container through the metering system independently with the first metering element and the second metering element;
receiving, by the control system from a scale, a first weight of a first amount of the commodity independently metered through the metering system by the first metering element during the at least one calibration routine, and a second weight of a second amount of the commodity independently metered through the metering system by the second metering element during the at least one calibration routine;

determining, by the control system, a first calibration factor for operating the first metering element based on the first weight, and a second calibration factor for operating the second metering element based on the second weight;

storing, in a memory element, the first calibration factor and the second calibration factor;

receiving, by the control system, a target application rate and a ground speed signal, the ground speed signal relating to a ground speed condition of the work vehicle;

determining, by the control system, a first speed control command for the first metering element according to the target application rate, the ground speed signal, and the first calibration factor;

determining, by the control system, a second speed control command for the second metering element according to the target application rate, the ground speed signal, and the second calibration factor; and operating, by the control system, the first metering element according to the first speed control command, and the second metering element according to the second speed control command;

wherein the calibration routine includes multiple first measurements, multiple second measurements, or consecutive first and second measurements from repeated rounds of metering commodity into one receptacle from the first metering element, the second metering element, or both of the first and second metering elements to obtain a combined amount of commodity in the receptacle; and wherein the control system generates:

the first control command for the first metering element based on the first calibration factor as derived from the multiple first measurements of the combined amount of commodity in the receptacle, the second control command for the second metering element based on the second calibration factor as derived from the multiple second measurements of the combined amount of commodity in the receptacle, or respectively, the first and second control commands for the first and second metering elements based on the first and second calibration factors as derived from the consecutive first and second measurements of the combined amount of commodity in the receptacle.

* * * * *

UNITED STATES PATENT AND TRADEMARK OFFICE
CERTIFICATE OF CORRECTION

PATENT NO. : 11,191,207 B2
APPLICATION NO. : 15/711840
DATED : December 7, 2021
INVENTOR(S) : Harmon et al.

Page 1 of 1

It is certified that error appears in the above-identified patent and that said Letters Patent is hereby corrected as shown below:

In the Claims

In Column 19, Claim 1, Line 55, delete "system:" and insert -- system generates: --, therefor.

Signed and Sealed this
Eighth Day of March, 2022

Drew Hirshfeld
*Performing the Functions and Duties of the
Under Secretary of Commerce for Intellectual Property and
Director of the United States Patent and Trademark Office*